United States Patent
O'Brien

[15] 3,675,136
[45] July 4, 1972

[54] APPARATUS FOR USE IN MEASURING PHASE DISPERSION PRODUCED BY APPARATUS OR A SYSTEM

[72] Inventor: Kevin Christopher O'Brien, Parsippany, N.J.

[73] Assignee: Bell Telephone Laboratories, Incorporated, Murray Hill, N.J.

[22] Filed: April 1, 1971

[21] Appl. No.: 130,204

[52] U.S. Cl. .................................. 328/133, 324/85, 331/38
[51] Int. Cl. ........................................................ G01r 25/00
[58] Field of Search ....................... 328/133; 324/85; 331/38

[56] References Cited

UNITED STATES PATENTS 3,562,646   2/1971   Maxwell et al. ........................... 324/85

*Primary Examiner*—John Kominski
*Attorney*—R. J. Guenther and William L. Keefauver

[57] ABSTRACT

First and second waves at distinct frequencies are mixed with a 3rd wave to produce fourth and fifth waves having a common frequency. The phase difference between the fourth and fifth waves is then detected to produce an output which is directly related to the phaseal relationship between the first and second waves.

2 Claims, 1 Drawing Figure

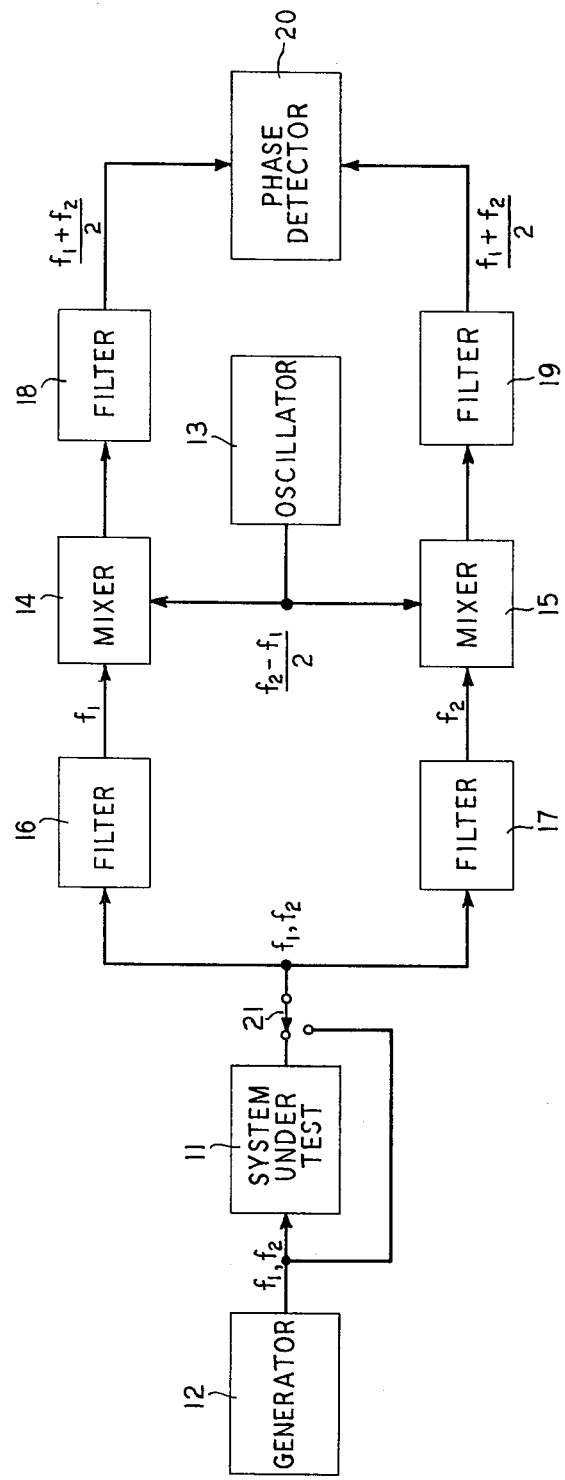

APPARATUS FOR USE IN MEASURING PHASE DISPERSION PRODUCED BY APPARATUS OR A SYSTEM

BACKGROUND OF THE INVENTION

1. Field of the Invention

This invention relates to measuring phase dispersion produced by apparatus or a system.

2. Description of the Prior Art

Two fixed, distinct frequency waves may be defined by the expressions $A_1 \cos(\omega_1 t + \Phi_1)$ and
$A_2 \cos(\omega_2 t + \Phi_2)$, respectively, where $\Phi_1$ and $\Phi_2$ equal the phase angles of the waves. When these waves pass through apparatus or a system, they may experience a phase dispersion in the sense that the waves are not phase delayed by the same amount. In many cases it is not only desirable but necessary to be able to measure such changes in phaseal relationship. The prior art, however, does not appear to disclose apparatus for making such measurements.

SUMMARY OF THE INVENTION

An object of the present invention is to produce an indication which is directly related to the phaseal relationship between two waves having fixed, distinct frequencies.

This and other objects of the invention are achieved by first mixing two waves at frequencies $f_1$ and $f_2$, respectively, with a third wave at a frequency $(f_2 - f_1)/2$ to produce fourth and fifth waves having a common frequency $(f_2 + f_1)/2$. The phase angles of the initial waves, as will become apparent in the following detailed discussion of a specific embodiment of the invention, are carried into the common frequency fourth and fifth waves. The phase difference between the fourth and fifth waves is then measured by a conventional prior art phase detector of the type which produces an output related to the phase difference between two like frequency waves.

BRIEF DESCRIPTION OF THE DRAWING

The drawing illustrates a block diagram of an embodiment of the invention being used for measuring the phase dispersion of a system.

DETAILED DESCRIPTION OF THE DISCLOSED EMBODIMENT

The block diagram shown in the drawing illustrates an embodiment of the invention in use for measuring phase dispersion occurring within a system 11. For measuring purposes, a generator 12 applies a pair of waves at frequencies $f_1$ and $f_2$, respectively, to system 11. Such a generator may use a highly stable crystal-controlled oscillator as a driving source to produce highly stable output waves at frequencies $f_1$ and $f_2$. For the present, these frequencies are assumed to be constant in value.

System 11 may comprise, for example, a system wherein the waves from generator 12 are up-converted frequency wise at its input end and down-converted to the original or some other frequencies at its output end. Phase dispersion within system 11 will, of course, cause the phaseal relationship of the waves at its output end to differ from that of the waves at its input end. The invention permits this difference to be measured.

In accordance with the invention, a local oscillator 13 produces a wave at the frequency $f_o = (f_2 - f_1)/2$. This wave is mixed by mixers 14 and 15 with the waves at frequencies $f_1$ and $f_2$, respectively. When necessary, filters 16 and 17 may be inserted before mixers 14 and 15, respectively, so as to heavily attenuate undesired waves. When waves at frequencies $f_1$ and $f_2$ are transmitted by respective channels in system 11, such filters are unnecessary.

Each of the mixers produces waves at the usual frequencies including those at the sum and difference of its input wave frequencies. These waves are applied to filters 18 and 19 each of which has a bandpass characteristic centered at the frequency $(f_1 + f_2)/2$. The attenuation provided by filters 18 and 19 in effect passes only the sum frequency wave from mixer 14 and the difference frequency wave from mixer 15, respectively. These like frequency waves are applied to a conventional phase detector 20 which produces an indication, such as by a meter, of the phase difference between the two waves.

For an understanding of the operation of the invention, the waves produced by generator 12 may be defined as:

$A_1 \cos(\omega_1 t + \Phi_1)$ and    1.

$A_2 \cos(\omega_2 t + \Phi_2)$, respectively,    2.

where $\Phi_1$ and $\Phi_2$ equal the initial phase angles of the waves (i.e., at time equal to zero).

In one use of the invention the two waves from generator 12 are applied directly to the embodiment of the invention illustrated in the drawing (i.e., by by-passing system 11 through the operation of a switch 21). When this is done, the outputs of filters 18 and 19 may be defined as $$A_3 \cos\left[\left(\frac{\omega_1 + \omega_2}{2}\right)t + \Phi_1 + \Phi_0\right] \text{ and} \quad (3)$$

$$A_4 \cos\left[\left(\frac{\omega_1 + \omega_2}{2}\right)t + \Phi_2 - \Phi_0\right], \text{ respectively,} \quad (4)$$

where $\Phi_0$ equals the initial phase angle of the waveform from oscillator 13. Detector 20 produces an indication of the difference in phase between expressions (3) and (4). In other words, the indication from detector 20 is the difference between $\Phi_1$ and $\Phi_2$, plus or minus $2\Phi_0$.

When switch 21 is positioned to apply the outputs of system 11 to the embodiment of the invention, the outputs from filters 18 and 19 may be defined as $$A_5 \cos\left\{\left[\omega_T - \omega_R + \frac{\omega_1 + \omega_2}{2}\right]t + \Phi_1 + \Phi_0 + \Phi_1{}^s\right\} \quad (5)$$

and $$A_6 \cos\left\{\left[\omega_T - \omega_R + \frac{\omega_1 + \omega_2}{2}\right]t + \Phi_2 - \Phi_0 + \Phi_2{}^s\right\} \quad (6)$$

where:

$\omega_T$ = the angular frequency of waves, if any, used for up-conversion at the input end of system 11, $\omega_R$ = the angular frequency of waves, if any, used for down-conversion at the output end of system 11, $\Phi_1{}^s$ = The phase angle added to the $f_1$ frequency waves by the system 11, and $\Phi_2{}^s$ = the phase angle added to the $f_2$ frequency waves by system 11.

Detector 20 detects the phase difference between expressions (5) and (6) which difference is $\Phi_1 - \Phi_2 - 2\Phi_0 + \Phi_1{}^s - \Phi_2{}^s$.    7.

The difference between this value and the value obtained when connecting the embodiment directly to generator 12, as discussed previously, equals the phase dispersion introduced by system 11.

A more specific set of expressions which includes terms for frequency drifting modifies expression (7) to become $$[\Delta_{\omega_2} - \Delta_{\omega_1} - 2\Delta_{\omega_0}]t + \Phi_1 - \Phi_2 - 2\Phi_0 + \Phi_1{}^s - \Phi_2{}^s \quad (8)$$

When the frequency dispersion of system 11 is constant over a period of time, this drifting effect can be reduced by either manually or automatically controlling the frequency of oscillator 13. In particular, the change (as a function of time) in the output of detector 20 indicates the cumulative drifting effect. This drifting effect may be reduced by using the change in the output of detector 20 to control the frequency of oscillator 13. When, on the other hand, the frequency dispersion of system 11 is undergoing changes at a rate sufficient to interfere with control of the above-described type, the alternative is to use more highly stabilized oscillators.

The invention lends itself to measuring in a simultaneous manner the phase dispersion over segments of a frequency band. This is accomplished by using a generator 12 which produces a plurality of equally frequency-spaced waves and adding additional channels and phase detectors. Specifically, two segments may be simultaneously measured by having generator 12 produce three waves at frequencies $f_1$, $f_2$ and $f_3$ where $f_2 - f_1 = f_3 - f_2$, connecting another filter-mixer-filter combination to the output of system 11, connecting oscillator 13 to the newly added mixer, and connecting another phase detector between the last filter of this newly added combination and filter 19. The bandpass of the first filter of the newly added combination is centered at frequency $f_3$ while the last filter in the newly added combination is centered at frequency $(f_2 + f_1)/2$. Centering at this last-mentioned frequency and using the $(f_2 - f_1)/2$ p output of oscillator 13 is possible because of selecting frequency $f_3$ so that $f_2 - f_1 = f_3 - f_2$. From this it is believed clear that any number of additional channels may be added and that the output of oscillator 13 may be used as one of the inputs for all of the mixers as long as the frequency differences between adjacent channels are made constant.

What is claimed is:
1. In combination,
   first mixing means for receiving on two input terminals waves at frequencies $f_1$ and $(f_1 - f_2)/2$, respectively, to produce an output having a wave at the frequency $(f_1 + f_2)/2a$,
   second mixing means for receiving on two input terminals waves at frequencies $f_2$ and $(f_1 - f_2)/2$, respectively, to produce an output having a wave at the frequency $(f_1 + f_2)2$,
   an oscillator connected to one of said first mixing means input terminals and one of said second mixing means input terminals to apply thereto waves at the frequency $(f_1 - f_2)/2$,
   first and second bandpass filtering means centered at the frequency $(f_1 + f_2)/2$ and connected to receive the outputs of said first and second mixing means, respectively, and
   a phase detector connected to receive the outputs of said first and second filtering means to produce outputs indicative of the phase difference between the outputs of said first and second filtering means.
2. A combination in accordance with claim 1 which further comprises
   third and fourth bandpass filtering means centered at the frequencies $f_1$ and $f_2$, respectively, and connected to the other of said first and second mixing means input terminals, respectively.

* * * * *